United States Patent
Guiet (10) Patent No.: US 11,116,135 B2
(45) Date of Patent: Sep. 14, 2021

(54) GRAPPLER, UTILITY IMPLEMENT, AND METHOD

(71) Applicant: DEERE & COMPANY, Moline, IL (US)

(72) Inventor: Lionel Guiet, Gray (FR)

(73) Assignee: DEERE & COMPANY, Moline, IL (US)

( * ) Notice: Subject to any disclaimer, the term of this patent is extended or adjusted under 35 U.S.C. 154(b) by 303 days.

(21) Appl. No.: 16/373,710

(22) Filed: Apr. 3, 2019

(65) Prior Publication Data

US 2019/0350134 A1    Nov. 21, 2019

(30) Foreign Application Priority Data

May 18, 2018   (DE) .......................... 102018207879.3

(51) Int. Cl.
| | |
|---|---|
| *A01D 87/12* | (2006.01) |
| *A01F 29/00* | (2006.01) |
| *A01F 29/14* | (2006.01) |
| *E02F 3/413* | (2006.01) |

(52) U.S. Cl.
CPC .......... *A01D 87/127* (2013.01); *A01F 29/005* (2013.01); *A01F 29/14* (2013.01); *E02F 3/413* (2013.01); *A01D 2087/128* (2013.01)

(58) Field of Classification Search
CPC ............ A01D 87/127; A01D 2087/128; A01F 29/005; A01F 29/14; A01F 29/08; Y10T 83/5733; Y10T 83/862; Y10T 83/8769; E02F 3/3677; E02F 3/413; B23D 17/00; B23D 35/001; Y10S 241/605; B26D 1/08; B26D 1/16; B26D 1/20; B26D 7/01; B26D 7/02; B65B 69/0033
See application file for complete search history.

(56) References Cited

U.S. PATENT DOCUMENTS

| | | | | |
|---|---|---|---|---|
| 3,918,476 A | * | 11/1975 | Jasinski | B26D 1/30 144/34.5 |
| 4,336,732 A | * | 6/1982 | Liet | A01F 25/2027 241/101.76 |
| 5,161,448 A | * | 11/1992 | Wangsness | A01D 87/127 241/605 |
| 6,263,774 B1 | * | 7/2001 | Rogness | A01D 87/0076 83/382 |
| 2009/0229433 A1 | * | 9/2009 | Kovalenko | E02F 3/965 83/13 |
| 2013/0149082 A1 | * | 6/2013 | Sheedy | A01D 87/127 414/412 |

FOREIGN PATENT DOCUMENTS

| | | | | |
|---|---|---|---|---|
| EP | 2732690 A1 | * | 5/2014 | ..... A01D 87/127 |
| FR | 2883450 A1 | | 9/2006 | |
| FR | 3010278 A1 | | 3/2015 | |
| WO | 0040072 A2 | | 7/2000 | |
| WO | 2011070037 A2 | | 6/2011 | |

OTHER PUBLICATIONS

European Search Report issued in counterpart application No. 19174875.5 dated Sep. 5, 2019. (7 pages).

* cited by examiner

*Primary Examiner* — Gregory W Adams (57) ABSTRACT

A grappler for a utility implement for handling bales includes a pivot frame, at least one support arm coupled to the pivot frame, and a selectively movable cutting device. The grappler forms part of a utility implement along with a bucket such that the grappler is movable with respect to the bucket.

18 Claims, 6 Drawing Sheets

GRAPPLER, UTILITY IMPLEMENT, AND METHOD

RELATED APPLICATIONS

This application claims priority to German Patent Application Ser. No. 102018207879.3, filed May 18, 2018, the disclosure of which is hereby incorporated by reference in its entirety.

FIELD OF THE DISCLOSURE

The present disclosure relates to a grappler for a utility implement for handling bales, a utility implement for handling bales with a bucket, and a method for handling a bale by means of a utility implement.

BACKGROUND

Conventional utility implements for handling bales are used to pick up, turn over, or transport bales and are used on industrial or agricultural vehicles such as, for example, tractors, loaders, baggers, etc. The bales may be industrial bales such as, for example, ones of materials like textiles, trash, etc., but may also be agricultural bales of hay, straw, silage, or another crop. The bales are picked up, for example, on the field and brought directly to a storage point or loaded onto an appropriate transport vehicle. To use the crop to feed livestock, bedding, or in any other way, the bales are possibly transported or turned over. Moreover, the bales frequently need to be separated from a covering or enveloping wrapping material which can be, for example, nets, films, or even twine. This can make an additional tool or an additional operating step necessary, which is costly and time-intensive. To avoid this, in some cases an attempt is made to transport bales using a bale slicer, which requires a great deal of finesse and can lead to the bale coming apart at an inappropriate time.

SUMMARY

In the present disclosure, a grappler for a utility implement for handling bales includes a selectively movable cutting device. In this way, the cutting device only interacts with a bale when the bale, or a wrapping material of the bale, is supposed to be cut through. For handling or for transport, a bale can be engaged by the grappler without the cutting device acting on the bale or the wrapping material. The wrapping material is not sliced through and the bale can be transported without losing its shape. To slice the bale or the wrapping material, the cutting device can be selectively guided to the bale. It is conceivable to equip a utility implement with a grappler at the factory or even subsequently, to refit it, or to provide a grappler as an interchangeable tool.

It is conceivable that the support arm is able to act directly on a bale, for example, to stabilize or secure it. At least one prong or a cross support with at least one prong, which can optionally engage in or on the bale, is provided on the support arm. The cutting device is designed to be movable at least essentially along the prongs and in particular up to an end region of the prongs, so that it can cut through the bale along the prongs or up to the end region of the prongs.

The grappler can have at least one support arm, on which the cutting device is accommodated, in particular in an articulated manner, or is made pivotable relative to the cutting device. However, two or more support arms can also be provided.

To move the cutting device, a cutting pivot motor can be provided, which engages the support arm at one end or a cutter support arm of the cutting device at the other end. The cutter pivot motor can be made as an electric motor or in any other appropriate way. However, it is particularly desirable if the cutter pivot motor is designed as a hydraulic motor, in particular a double-acting hydraulic motor, which has a hydraulic cylinder and a hydraulic piston. The pivot motor can be intended to be actuated manually or automatically and is supplied with a hydraulic medium or pressurized by a hydraulic pressure source in the form of a pump provided on a utility vehicle.

It is advantageous if a pivoting arm, which is pivoted at one end on the support arm and at the other end is pivoted on the cutter support arm, is provided. In this way, for example, a movement of the support arm relative to the cutter support arm can be compensated, as can occur, for example, in the case of pivoting about different pivot points.

It may also be desirable if the cutting device is held in a guide in the support arm, in particular so that it can slide. This capture can take place directly on the support arm. The cutting device, however, is held in the guide via the cutter support arm or in a guide in the cutter support arm.

An implement for handling bales with at least one bucket can have a grappler which is made movable with respect to the bucket. The implement is made in particular as an attachment or forms a component of such an attachment. It is conceivable that the implement is equipped with a grappler at the factory or subsequently, or is retrofitted, or a grappler is provided as an interchangeable tool. The implement is suitable for use on an industrial or, in particular, an agricultural vehicle. The vehicle can, for example, be a tractor, a loader, a telescoping loader, or a similar utility vehicle. The bucket can be designed in the form of one or more prongs, a fork, or in another suitable way. In particular, however, it is made as a scoop.

The grappler can be slidable relative to the bucket or can be movable in another way. The cutting device or the grappler or a movement thereof can be controlled manually or automatically. A control means or apparatus for selective movement of the grappler relative to the bucket is provided. The control means or apparatus can, for example, be a manual device. In another example, a pivot motor is provided, in particular in the form of a hydraulic motor with a hydraulic cylinder and a piston, which is supplied with hydraulic pressure from a pressure source such as a pump and is provided on the vehicle. The pivot motor or the cutter pivot motor can be controlled, for example, directly, but in particular it is operated by a control device, which is provided on the vehicle, for example, in the form of a joystick. A (partially) automated control or regulation is also conceivable.

According to one method for handling a round bale, in particular, by means of an implement, the cutting device lags behind a movement of the grappler when the grappler moves toward a bale, in particular is timewise offset. In this way, the grappler or the prong(s) can engage the bale first, in order to stabilize or secure it. Only after that will the cutting device then be moved up to the bale in order to cut through it or a wrapping material surrounding it. In this way, the bale can, for example, be transported by means of the implement without the cutting device acting on or engaging the bale or the wrapping material. Through its prongs, which run ahead of the cutting device, the grappler can also, in addition or alternatively, contribute to the bale being stabilized or secured during a slicing operation.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
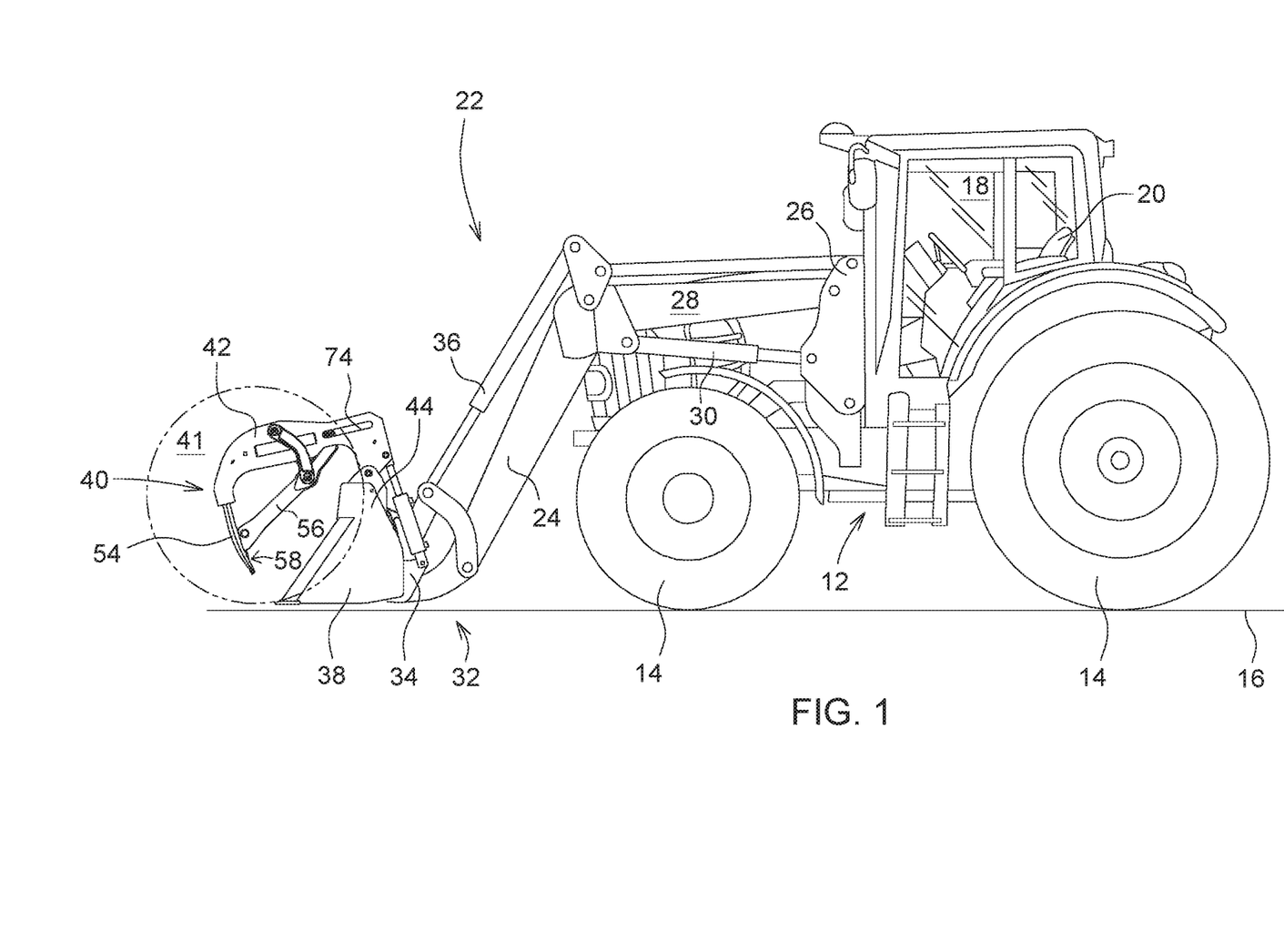
FIG. 1 shows an agricultural utility vehicle with a utility implement for handling bales with a bucket and a grappler.

An agricultural utility vehicle 10 in the form of a tractor is shown schematically in FIG. 1. The utility vehicle 10 is self-propelled and has a frame 12, which is supported on the ground 16 by wheels 14. In addition, the utility vehicle 10 has a cabin 18 with an operator seat 20 for an operator.

A loading device 22 in the form of a front-end loader is provided on the utility vehicle. The loading device 22 comprises a loader boom 24, which can be mounted on both sides of the utility vehicle 10, where the loader boom 24 in accordance with the example shown can be attached to the utility vehicle 10 by means of a mounting bracket 26 connected to the frame 12.

The loader boom 24 comprises support arms 28 that run parallel to each other on both sides of the utility vehicle 10, and are connected to each other via a crossbar, which is not shown, and can be pivoted via hydraulic lift cylinders 30, which likewise extend on both sides of the utility vehicle 10. A utility implement 34 is mounted at one free end 32 of the loader boom 24 by means of a hydraulic pivot cylinder 36 such that it can pivot.

Figure 2:
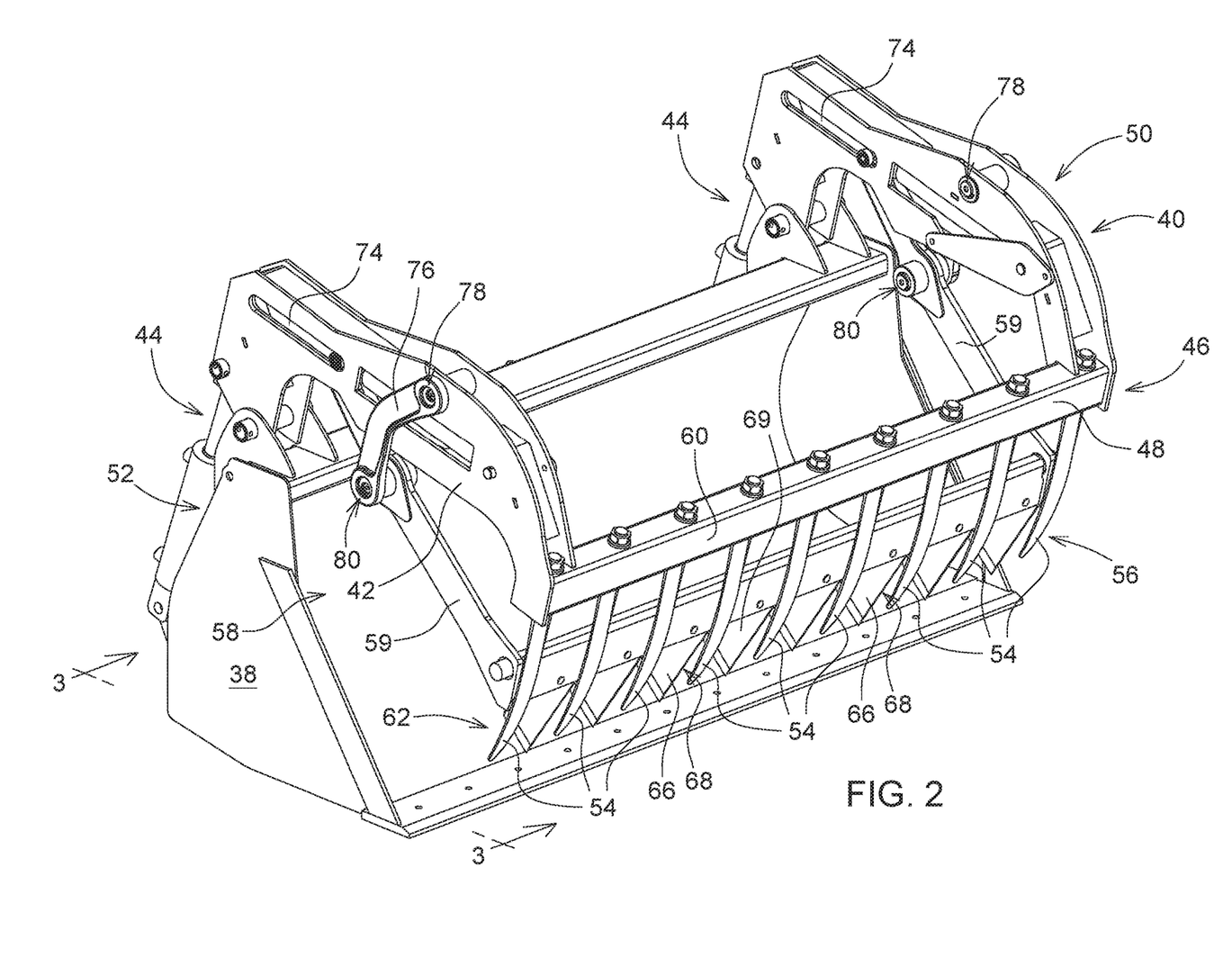
FIG. 2 shows the utility implement from FIG. 1 in a perspective view.
Figure 3:
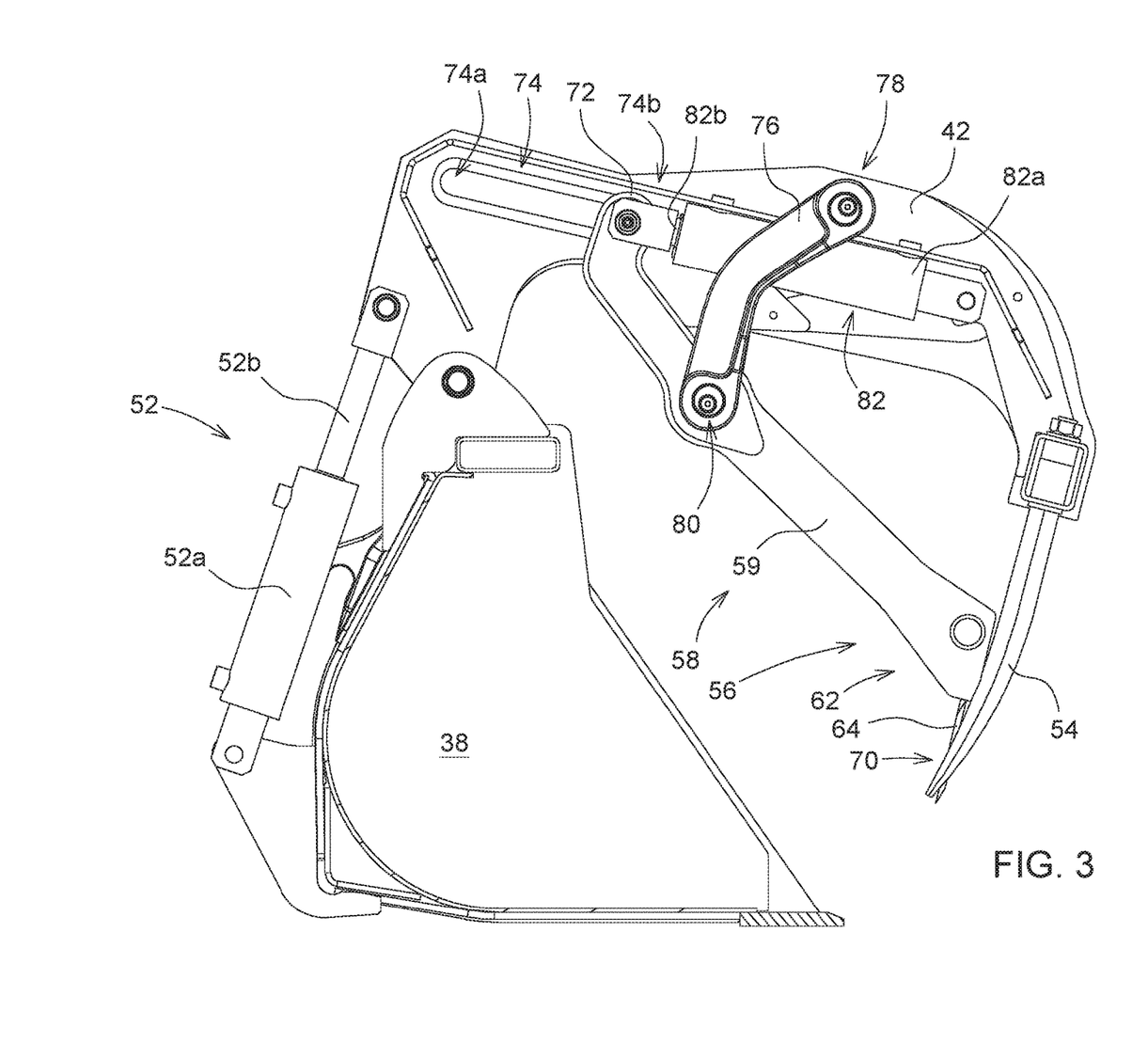
FIG. 3 shows a side view of the utility implement.

Referring to FIGS. 2 and 3, the implement 34 has a bucket 38 and a grappler 40. The bucket 38 is made as a scoop, which is suitable for picking up a bale 41, in particular a round agricultural bale consisting of a crop, in order to handle or transport it. Other material, for example, bulk goods, crop, soil, etc., or even bales of a different shape, for example, square bales, or industrial bales, can also be picked up or handled using the bucket 38.

The grappler 40 has two support arms 42, which are each connected via a pivot to the right and left sides of the bucket 38 such that they can pivot. In a region 46 turned away from the utility vehicle 10, the support arms 42 are connected via a cross support 48 so that they form a pivot frame 50. In addition, a pivot motor 52 is provided, which can be controlled via a control means or apparatus (not shown) provided in the cabin 18 of the utility vehicle 10 so that the grappler 40 or the pivot frame 50 can be moved or pivoted. The control means or apparatus may be, for example, a joystick. The pivot motor 52 can be made, for example, as a double-acting hydraulic motor having a hydraulic cylinder 52a and a piston 52b, which is supplied with hydraulic pressure from the utility vehicle 10.

A plurality of approximately evenly spaced prongs 54 are provided on the cross support 48, the prongs extending approximately perpendicularly away from the cross support 48 in the direction of the bucket 38 and ending in pointed tips in an end region turned away from the cross support 48. According to this embodiment, the prongs 54, 54a are separably attached to the cross support 48, in particular are bolted on, and are approximately evenly spaced. Other arrangements are also conceivable, for instance the prongs 54 can be unevenly spaced, for example, or even arranged in groups.

In addition, a cutting device 58 is provided, which has a left- and right-side cutter support arm 59, which is connected via a cross support 60 in region 46. A cutter strip 62, which has a plurality of tooth-like knives 64, is accommodated on the cross support 60. The knives 64 are each made in the form of essentially isosceles triangles and have two sides 68 made as cutting edges 66, which meet at the tips 70 and which point away from the cross support 60.

The cutter support arms 59 are each mounted in an end region 72 turned away from the cutter strip 62 in a guide 74 made in the form of an elongated slot, with a first end region 74a turned toward the utility vehicle 10 and an end region 74b turned toward the bale 41 in use, on which the support arms 42 are mounted so they can slide. In addition, in each case a pivot arm 76 is provided, which at one end it is pivoted via a first pivot 78 on one of the support arms 42 and at the other end via a second pivot 80 on one of the cutter support arms 59, such that a, or the, movement pattern of the cutter support arm 59 is determined via the pivot arm 76 together with the guide 74. A cutter pivot motor 82, which is made as a kind of double-acting hydraulic cylinder, includes a hydraulic cylinder 82a and a piston 82b, which is mounted at the other end on the support arm 42, engages at the end region 72 of the cutter support arm 59.

Referring to FIGS. 4a-f, the functioning of the grappler 40 and in particular the cutting device 58 will be described in more detail. To pick up the bale 41, the grappler 40 is brought into a raised position, shown in FIG. 4a, from its resting position, shown in FIG. 1, by means of pivot motor 52. In the raised position, the prongs 54, or their pointed end regions 56, are disposed above the bale 41. The hydraulic piston 82b of the cutter pivot motor 82 is in its extended position relative to the hydraulic cylinder 82a, so that the end region 72 of the cutter support arm 59 is disposed in the end region 74a of the guide 74 and the pivot arm 76 is shifted backward and up so that the knives 64, or the cutters 66, are disposed to the rear or above the cross support 48 and do not interact with the bale 41 or with a wrapping material 41a that surrounds the bale 41.

Figures 4A, 4B:
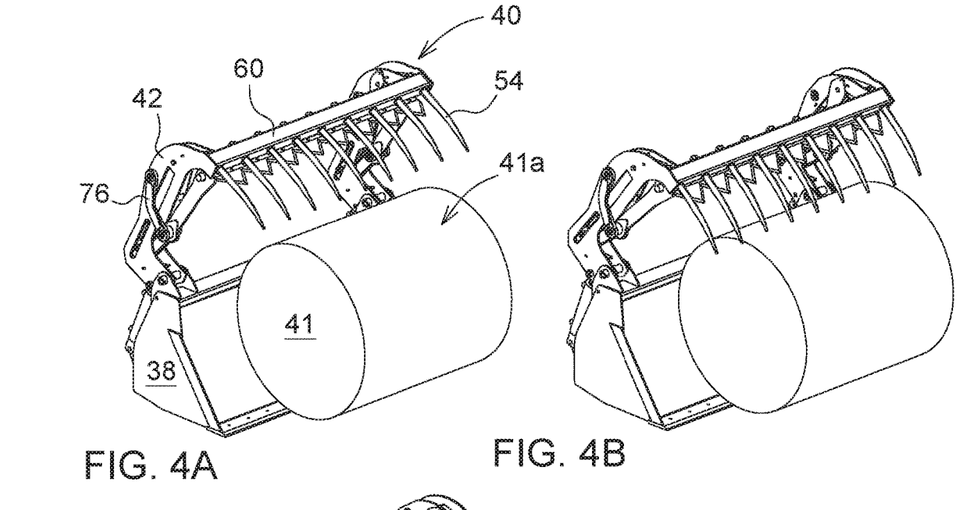
FIGS. 4a-f show the utility implement in a perspective view with a bale, where the grappler is shown in different positions.
Figure 4C:
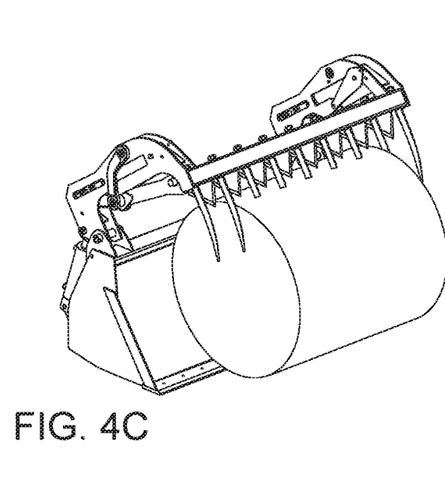
Figure 4D:
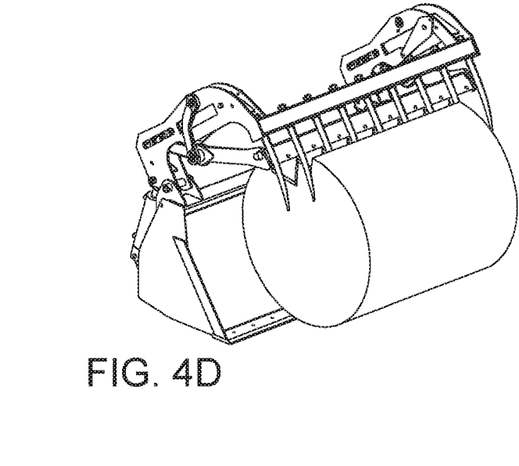
Figure 4E:
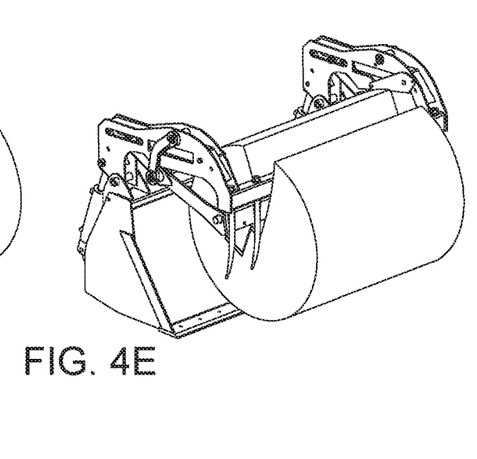

In a next step (FIG. 4b), the grappler 40 is pivoted in the direction of the bale 41 by the pivot motor 52 or by an extension of the hydraulic piston 52b relative to the hydraulic motor 52a so that the sharp end regions 56 of the prongs 54 and then, according to FIG. 4c, the entire prongs 54 completely penetrate into the bale. In this position, the bale 41 can, for example, be transported since the prongs 54 stabilize the bale 41 relative to the bucket 38.

Figure 4F:
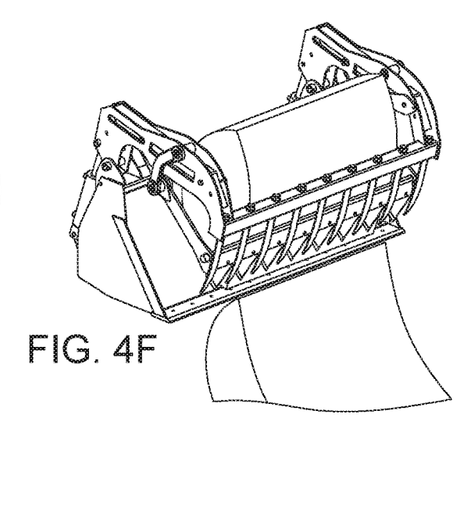

To part the wrapping material 41a or to cut the bale 41, the cutter pivot motor 82, or its hydraulic piston 82b, is now driven in relative to the hydraulic cylinder 82a, so that the end region 72 of the cutter support arm 59 moves in guide 74 in the direction of the end region 74b. The knives 64 penetrate the bale 41 and first cut through a wrapping material 41a that may be present and then begin to cut the bale 41 or, in particular, to slice it in two (see FIG. 4d). If the end region 72 of the cutter support arm 59 contacts the end region 74b of the guide 74, the cutter support arm 59 and thus the cutter strip 62 or the knives 64 cannot move any further in the direction of the bale 41 relative to the support arm 42. The knives 64 or, in particular the relevant tips 70 of the knives 64, now abut the pointed end region 56 of the prongs 54. The cutter support arm 59 now pivots according to the drawing in FIG. 4e together with the support arm 42 on the bale 41 such that the prongs 54 penetrate further into the bale 41 and the bale 41 is simultaneously sliced by the cutting edges 66 of the knives 64 until the bale 41 is at least essentially cut through, e.g., in half, as is shown in FIG. 4f. Here it can be provided, for example, that the cutting device 58 moves together with the grappler 40 or that the cutter device 58 again lags behind the movement of the grappler 40.

Figure 5A:
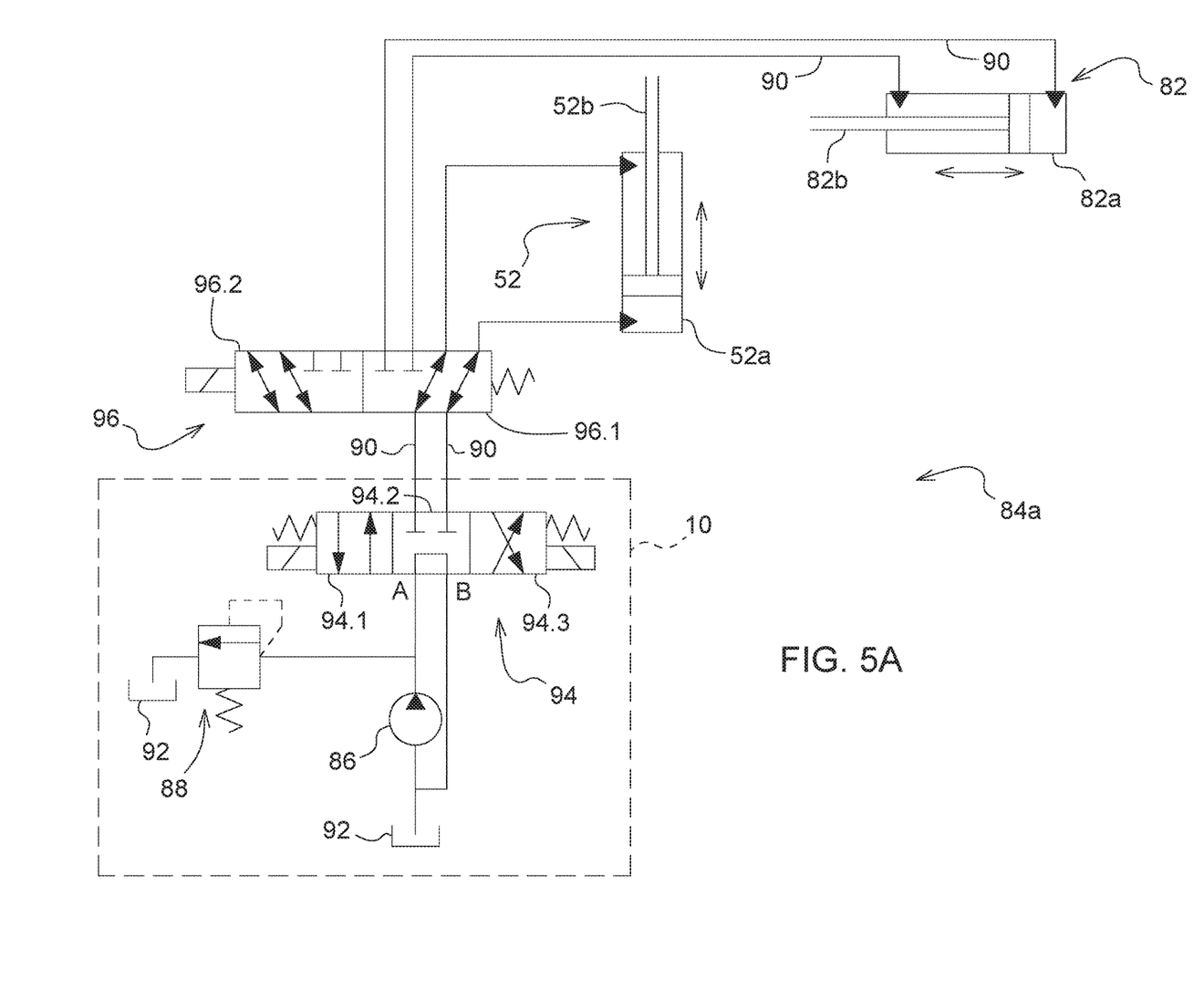
FIGS. 5a-b show two alternative embodiments of a hydraulic circuit for such a utility implement.
Figure 5B:
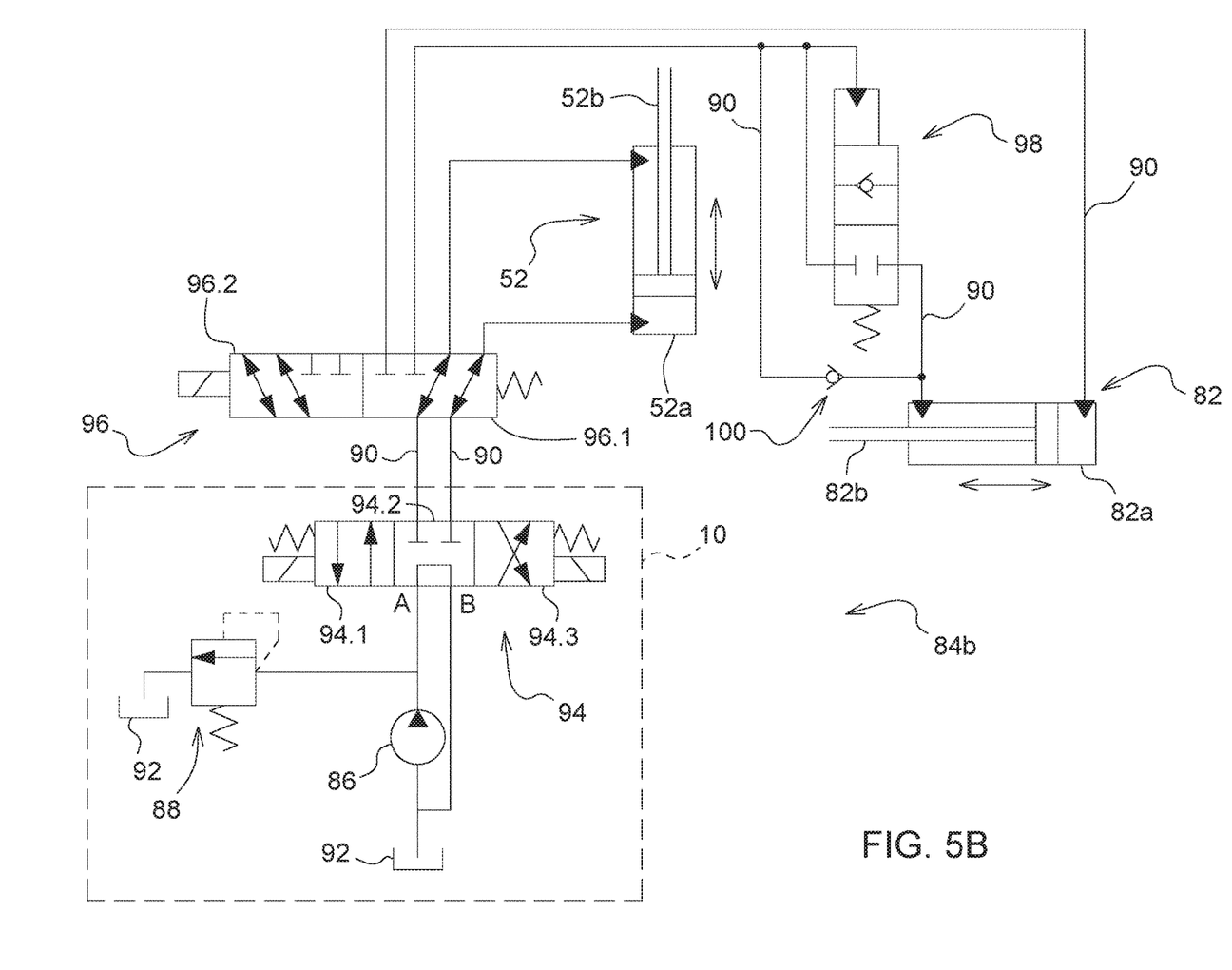

FIGS. 5a and b show two hydraulic circuits 84a, b, which are suitable for controlling the pivot motor 52 and the cutter pivot motor 82 in correspondence with the procedure described above, where corresponding components in the figures are designated with the same reference numbers below.

According to FIGS. 5a and b, the hydraulic circuit 84 is supplied with pressure from a pressure source 86 provided in the utility vehicle 10, where, a relief valve 88 is provided via which hydraulic pressure in a reservoir 92 can drain off if there is a pressure in lines 90 that exceeds a limit pressure. In addition, at the utility vehicle 10, there is a control valve 94 which is made as a 4/3 valve and can take settings 94.1, 94.2, and 94.3, and which has outlets A and B which can selectively be supplied with pressure in correspondence with the relevant setting of the control valve 94. If the implement 34 is not in operation, control valve 94 takes its neutral setting 94.2, in which neither connection A, B is supplied with pressure.

According to the embodiment shown in FIG. 5a, a switching valve 96, which is designed as a 6/2 valve and can take positions 96.1 and 96.2, is connected to the control valve 94, which allows it, in correspondence with its setting, to supply either the pivot motor 52 or the cutter pivot motor 82 selectively with pressure. In order to pivot the pivot frame 50 carrying the prongs 54 upward, the control valve 94 takes position 94.1, in which the output A is supplied with hydraulic pressure. The switching valve 96 takes its position 96.1. To pivot the pivot frame 50 downward, the control valve 94 takes position 94.3, in which the output B is supplied with pressure. If the cutter strip 62 carrying the knives 64 is pivoted in the direction of the bale 41, the switching valve 96 is brought into its corresponding position 96.2, while the control valve 94 remains in its position 94.3. If the cutter strip 62 is to be moved rearward, i.e., away from the bale 41, in which position the knives 64 or the cutters 66 are not engaged with the bale 41 or the wrapping material 41a surrounding the bale 41, the control valve 94 is brought into its position 94.1, while the switching valve 96 is in its position 96.2. The actuation of the control valve 94 and the switching valve 96 here can essentially take place through an operator via a corresponding control element, such as disposed in cabin 18 but not shown. The control element may be, for example, a joystick or the corresponding switch elements. However, a (semi)automatic control is also conceivable here, for example, by means of a regulation or control device (not shown) and, in particular, a regulation or control device of the utility vehicle 10.

Referring to FIG. 5b, an alternatively designed hydraulic circuit 84b is shown. This circuit likewise has a pressure source 92, which supplies a control valve 94 with pressure. However, a switching valve is not connected to the control valve 94, but rather the pivot motor 52 and the cutter pivot motor 82 are connected in parallel. Here, a sequence valve 98 in the form of a pressure sequence valve and a check valve 100 are connected to the cutter pivot motor 82 such that the cutter pivot motor 82 operates in order to pivot the cutter strip 62 in the direction of the bale 41 when the control valve 94 is in its position 94.3. Moreover, the pivot motor 42 is supplied with pressure so that it pivots the pivot frame 50 carrying the prongs 54 in the direction of the bale 41, and at the same time a corresponding pressure, which opens the sequence valve 98, is present in lines 90. The pressure should arise when the prongs 54 have penetrated completely into the bale 41, so that the cutter strip 62 is automatically actuated if the prongs 54 have entered the bale 41.

Through the action of the knives 64, which are populated with cutting edges 66, the bale 41 or the wrapping material 41a is sliced through so that the counter-pressure acting on the prongs 54 becomes reduced. In this way, the pivot motor 52 is again supplied with pressure so that the grappler 40 is again pivoted in the direction of the bale 41 and the prongs 54 penetrate deeper into the bale 41, where the cutting device 58 is again actuated. The alternating course can desirably affect the cutting/separating process.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A grappler for a utility implement for handling bales, comprising:
    a pivot frame;
    a support arm coupled to the pivot frame;
    a selectively movable cutter; and
    wherein the support arm comprises at least one prong, where the cutter is movable along the at least one prong.

2. The grappler of claim 1, wherein the support arm comprises a cross support including at least one prong, where the cutter is movable along the at least one prong.

3. The grappler of claim 1, wherein the support arm is pivotable relative to the cutter.

4. The grappler of claim 1, further comprising a cutter pivot motor engaging at one end on the support arm or at a cutter support arm of the cutter.

5. The grappler of claim 4, further comprising a pivot lift pivotally coupled at one end to the support arm and at the other end to the cutter support arm.

6. The grappler of claim 4, further comprising a guide slot defined in the support arm, the cutter slidably movable over the cutter support arm and within the guide slot.

7. A utility implement for handling a bale, comprising:
    at least one bucket configured to collect the bale;

a grappler comprising a pivot frame, a support arm coupled to the pivot frame, and a selectively movable cutter;

wherein, the grappler is movable relative to the bucket; and wherein the grappler is pivotable relative to the bucket.

8. The utility implement of claim 7, further comprising a control apparatus for selectively moving grappler relative to the bucket.

9. The utility implement of claim 8, wherein the control apparatus selectively moves the grappler manually or automatically.

10. The utility implement of claim 7, wherein the support arm comprises at least one prong, where the cutter is movable along the at least one prong.

11. The utility implement of claim 7, wherein the support arm comprises a cross support including at least one prong, where the cutter is movable along the at least one prong.

12. The utility implement of claim 7, wherein the support arm is pivotable relative to the cutter.

13. The utility implement of claim 7, further comprising a cutter pivot motor engaging at one end on the support arm or at a cutter support arm of the cutter.

14. The utility implement of claim 13, further comprising a pivot lift pivotally coupled at one end to the support arm and at the other end to the cutter support arm.

15. The utility implement of claim 13, further comprising a guide slot defined in the support arm, the cutter slidably movable over the cutter support arm and within the guide slot.

16. The utility implement of claim 7, wherein the grappler comprises a cross support and the support arm comprises a first support arm and a second support arm, where the first support arm is pivotally coupled to a first side of the bucket and the second support arm is pivotally coupled to a second side of the bucket.

17. The utility implement of claim 7, further comprising:

a first cutter support arm and a second cutter support arm, the first and second cutter support arms being coupled to a cross support; and a cutter strip comprising a plurality of knives disposed on the cross support.

18. A method for handling a bale, comprising:

providing a utility implement including a bucket, a grappler, a cutter, and a control apparatus;

collecting the bale with the bucket;

controlling a movement of the grappler toward the bale when the bale is in the bucket;

controlling a movement of the cutter such that the movement of the cutter lags behind the movement of the grappler.

\* \* \* \* \*